H. H. BUNZEL.
METHOD FOR DETERMINING THE OXIDASE CONTENT OF PLANT JUICES.
APPLICATION FILED MAY 27, 1912.

1,034,400.

Patented July 30, 1912.

3 SHEETS—SHEET 1.

H. H. BUNZEL.
METHOD FOR DETERMINING THE OXIDASE CONTENT OF PLANT JUICES.
APPLICATION FILED MAY 27, 1912.

Patented July 30, 1912.

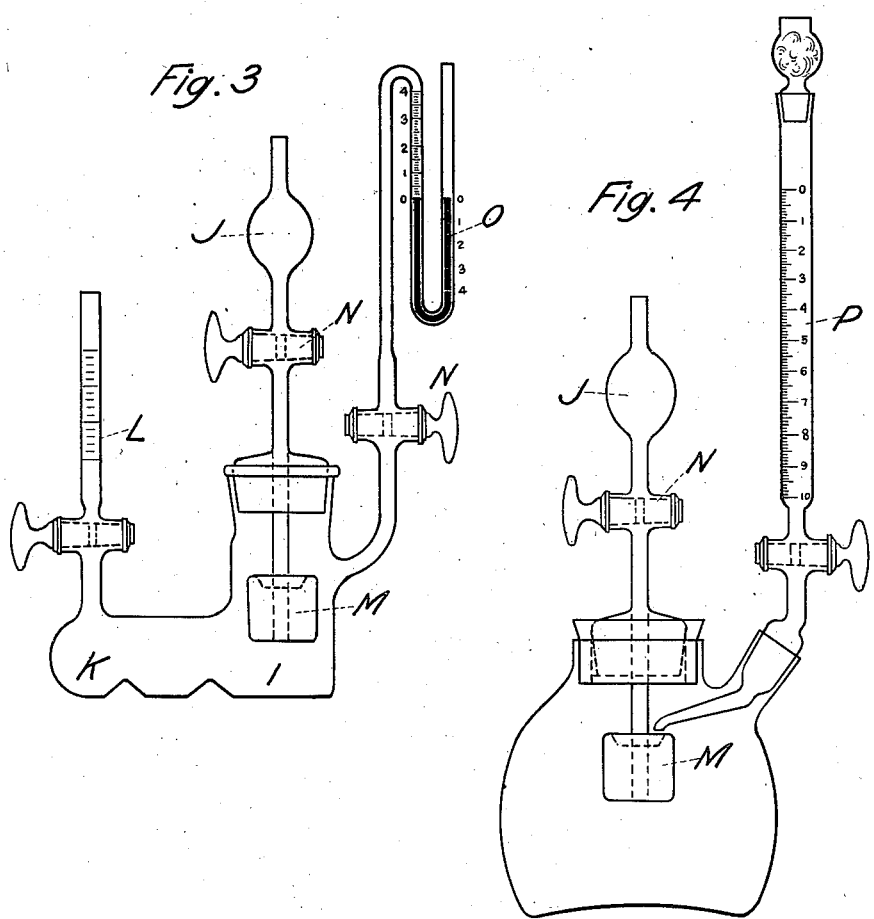

UNITED STATES PATENT OFFICE.

HERBERT H. BUNZEL, OF WASHINGTON, DISTRICT OF COLUMBIA.

METHOD FOR DETERMINING THE OXIDASE CONTENT OF PLANT-JUICES.

1,034,400.     Specification of Letters Patent.     Patented July 30, 1912.

Application filed May 27, 1912. Serial No. 700,134.

(DEDICATED TO THE PUBLIC.)

*To all whom it may concern:*

Be it known that I, HERBERT H. BUNZEL, an employee of the Department of Agriculture of the United States of America, residing in the city of Washington, District of Columbia, (whose post-office address is Washington, District of Columbia,) have invented a new and useful Method for Determining the Oxidase Content of Plant-Juices.

This application is made under the act of March 3, 1883, chapter 143 (22 Stat., 625), and the invention herein described and claimed may be used by the Government of the United States or any of its officers or employees in the prosecution of work for the Government or any person in the United States, without payment to me of any royalty thereon.

My invention relates to a process for measuring enzyms in vegetable and animal juices.

The object of my invention is to provide a process simple in method and capable of measuring accurately respiratory enzyms in vegetable and animal juices, the so-called oxidases.

My process is designed particularly for aiding scientists in the study and investigation of plant tissue respiration and cellular activity. It is well known that the quantity of oxidases is intimately connected with the cause of certain plant diseases, such for instance, as the mosaic disease of tobacco and the curly-top disease in sugar beets. In order to successfully cure such diseases, it is essential to definitely ascertain the quantity of oxidases present in the plants. It is also known that respiratory enzyms play a vital rôle in animal life. Therefore, I do not confine the scope of usefulness of my process exclusively to measuring respiratory enzyms in agricultural products, but the same may be satisfactorily employed for measuring respiratory enzyms in animal juices.

The accompanying drawings illustrate the apparatus employed in the different steps taken in the practice of my process.

Figure 1:
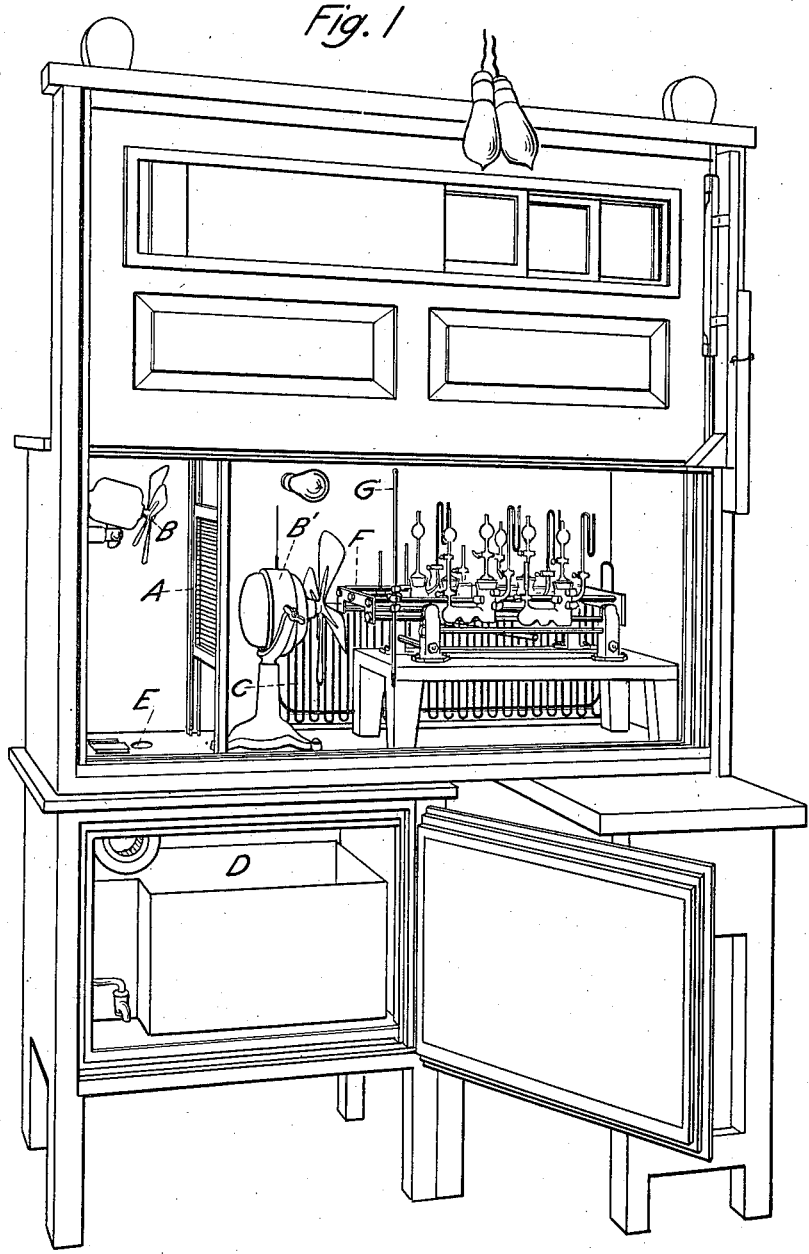
Figure 2:
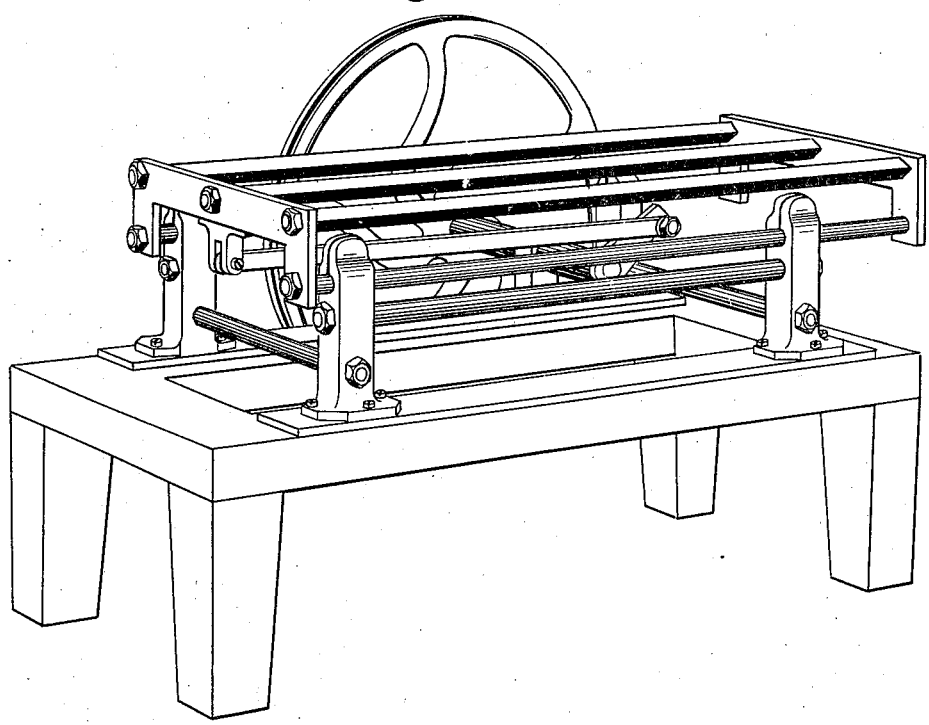

Figure 1, is a front perspective view of the thermostat, with the slides elevated and door of ice chest open, showing the arrangement of the elements used in regulating the temperature and agitating the juices. Fig. 2, is a perspective view of the shaking machine. Fig. 3, is a view of the oxidase apparatus and Fig. 4, is a view of the titration apparatus in which the final test is made.

In operation, I employ a thermostat, preferably of the type shown in Fig. 1, of the drawings. This thermostat is of special construction, and consists of a heater, A, made of ebony asbestos. The wire used for heating is drawn tightly through rings fastened on the perpendicular sides of said frame. On account of the low specific heat of the medium, it is necessary to agitate the air in the box thoroughly during the experiments. This object is accomplished by means of two fans, B and B'.

B is a small fan mounted in the rear of the heater, A, and used in the beginning of the experiments until the interior of the box has attained the temperature desired, whereupon said fan is stopped and B', a large fan, located in front of the heater, A, is started. The agitation of the air by the fans in this manner keeps the temperature throughout the box constant within .1° to .2°.

C, represents the thermoregulator, which is a tube of about 14 meters' length, mounted on a wooden frame. The frame is fastened to the wall of the box in such a way as to permit a space of approximately 2 centimeters between the glass tube and the wall, thus providing space for free circulation of air around all parts of the thermoregulator. If experiments are to be carried on at or below room temperature, cold air is blown into the thermostat. The air is cooled in the ice chest, D, arranged at the bottom of the box and blown into the thermostat through an opening E. This opening E may be closed by means of a sliding board.

Arranged in the thermostat is a shaking apparatus F, constructed in manner as shown in Fig. 2 of the drawings. This machine has an endwise movement and is operated by a motor. It is of ample size to permit the carrying of nine or more oxidase apparatus. A thermometer, G, is attached to the carriage for the purpose of indicating the degree of temperature in the box. Clamped to the bars of the machine are oxidase apparatus, preferably of the type shown in Fig. 3 of the drawings.

In practising my process, I clamp the oxidase apparatus, Fig. 3, to the carriage in the thermostat, and pass a pyrogallol solution into compartment, I, of the apparatus by means of the bulb, J. A suitable quantity of plant or vegetable juice is also passed into compartment, K, of said apparatus, through burette, L, and the basket designated, M, is charged with a normal sodium hydrate solution. The stopcocks, N N, are opened, and the doors and windows of the thermostat tightly closed. After completion of these steps, the thermostat is then heated to the temperature desired. Then the windows are opened just sufficiently to allow the introduction of the arm for closing all the stopcocks but that on the manometer, O. Windows are closed again and the shaking machine is set in motion by means of a motor, and agitation of the juices and oxidizable material in the oxidase apparatus commenced. The reaction begins as soon as the shaking is started. At intervals, the shaking process is interrupted long enough to permit the analyst to take the readings of the manometer, O, on the oxidase apparatus. The reaction is allowed to go on until no more oxygen is absorbed from the juices being tested. When this stage is reached, the glass basket, M, is carefully removed from the oxidase apparatus and quickly wiped, 2 drops of phenolphthalein solution added to the sodium hydrate solution contained therein, and the basket immediately fitted into the wide neck of the titration apparatus shown in Fig. 4. The burette, P, on said apparatus is filled with $\frac{1}{10}$ normal sulfuric acid, and the liquid in the basket, M, is titrated with constant gentle agitation just to the point of the disappearance of the red color. The burette, P, is then read and 3 drops of Congo red solution is placed in said basket and the titration continued until the bright red color disappears. From the difference between the two end points is calculated the amount of carbon dioxid absorbed.

By long experiments I have found that the method herein disclosed for measuring respiratory enzyms in vegetable and animal juices gives accurate results. I do not confine myself to the exclusive use of the special form of apparatus shown in the drawings in practising my method, but any suitable thermostat, shaking machine, oxidase and titration apparatus may be satisfactorily employed, in making this test. Furthermore, I do not confine my method solely to the testing of plant juices, but animal juices may be subjected to the same process with equally good results.

Having thus described my invention, I claim:

1. The method herein described of determining the oxidase content of plant juices which consists in placing the plant juice in an oxidase apparatus with oxidizable material, subjecting the contents to a fixed temperature, and agitating the contents during the heating period until the maximum oxygen absorption is reached.

2. The method herein described of determining the pathological condition of plant juices which consists in placing the juices in an oxidase apparatus with oxidizable material, subjecting the contents to a fixed temperature, agitating the contents during the heating period until the maximum oxygen absorption is reached, and then subjecting the alkali which has absorbed carbon dioxid to titration.

In testimony whereof I have signed this specification in the presence of two subscribing witnesses.

HERBERT H. BUNZEL.

Witnesses:
CARL L. ALSBERG,
O. F. BLACK.